United States Patent [19]
Sugita et al.

[11] 3,944,530
[45] Mar. 16, 1976

[54] ARTICLE MADE OF PROPYLENE-ETHYLENE COPOLYMER

[75] Inventors: Yasunori Sugita, Tokyo; Yasuhiko Itagaki, Yokohama, both of Japan

[73] Assignee: Mitsui Toatsu Chemicals, Incorporated, Tokyo, Japan

[22] Filed: Sept. 17, 1974

[21] Appl. No.: 506,761

[30] Foreign Application Priority Data
Sept. 27, 1973 Japan.............................. 48-107593

[52] U.S. Cl................................. 260/88.25; 264/99
[51] Int. Cl.²............... C08F 210/00; C08F 212/00; B29C 17/06; B29C 23/00
[58] Field of Search ........... 260/80.78, 88.2; 264/99

[56] References Cited
UNITED STATES PATENTS

| | | | |
|---|---|---|---|
| 2,956,991 | 10/1960 | Coover et al. ...................... | 260/93.7 |
| 3,244,778 | 4/1966 | Ninneman............................ | 264/89 |
| 3,294,885 | 12/1966 | Clines et al. ......................... | 264/99 |
| 3,449,263 | 6/1969 | Watt .................................. | 252/429 |
| 3,541,189 | 11/1970 | Yoshikawa et al. .................. | 264/25 |
| 3,736,307 | 5/1973 | Perry................................ | 260/88.2 R |

FOREIGN PATENTS OR APPLICATIONS
471,117    1972    Japan

*Primary Examiner*—Joseph L. Schofer
*Assistant Examiner*—A. L. Clingman
*Attorney, Agent, or Firm*—Fisher, Christen & Sabol

[57] ABSTRACT

Articles such as containers made of a crystalline olefin polymer having improved transparency and impact strength obtained by biaxially extending an extruded tubular body of said polymer at an orientation temperature below the melting point to attain an extension magnification ratio of at least 1.5 for each of longitudinal and lateral directions wherein said polymer is a statistical random copolymer of propylene and from 0.3% to 5.0% by weight ethylene having a melt index of 0.6 – 3.0 g/10 min. Optionally, from 0.03 to 0.20 part by weight of aluminum p-tert-butyl benzoate or sodium p-tert-butyl benzoate are added to 100 parts by weight of said copolymer.

3 Claims, No Drawings

ARTICLE MADE OF PROPYLENE-ETHYLENE COPOLYMER

BACKGROUND OF THE INVENTION

1. Field of the Invention

The present invention relates to articles made of a highly crystalline olefin polymer which have improved clarity and impact strength. More particularly, the present invention relates to articles such as containers obtained by the biaxial orientation blow molding of said olefin polymer.

2. Description of the Prior Art

As plastic containers, those made by conventional blow molding techniques from raw materials such as high density polyethylene, low density polyethylene and polyvinyl chloride, have heretofore been prevalent. However, there has recently been extensive interest in obtaining containers made by so-called biaxial orientation blow molding and this technique has been used to some extent with polyvinylidene chloride, polyvinyl chloride, polystyrene, crystalline homopolymers and copolymers of olefins such as polypropylene, etc. Techniques that use polypropylene or copolymers containing a major proportion thereof as raw material have attracted wide interest.

Biaxial orientation blow molding is a forming method wherein orientation is built up in a hollow body by extension in biaxial directions, i.e. longitudinal and lateral directions, so as to improve physical properties. One such method comprises extending a tubular plastic body formed by extrusion molding or injection molding in its longitudinal direction at a temperature within the region of the orientation temperature, and then further extending also in the lateral direction in a metal mold by blowing thereinto a pressurized fluid to shape the body into a desired form and this is known as the successive orientation method. Another method comprises forming a preliminary product by preforming the tubular body at orientation temperature in a metal mold and further blowing a pressurized fluid thereinto in a second metal mold having the desired final configuration, or blowing a pressurized fluid into said second mold while imparting longitudinal extension mechanically to shape into the desired form, and this is known as the simultaneous orientation method. Many methods have been proposed by, for example, Japanese Pat. Nos. 521,711 and 662,944, Japanese Pat. publication No. 47-1117, U.S. Pat. Nos. 3,294,885 and 3,244,778, etc. some of which have been used in practical application with various thermoplastic resins as the raw material therefor.

In particular, containers formed by biaxial extension blow molding of a highly crystalline homopolymer or copolymer of olefin such as polypropylene may be capable of exhibiting highly useful properties for packaging containers due to the great improvements in physical properties such as transparency, rigidity, impact strength and gas impermeability etc., compared to such containers made by conventional blow molding. However, among these properties, transparency is inferior to that of polyvinyl chloride containers made by conventional blow molding and impact strength is inferior to that of high density polyethylene containers so that further improvement is required even in the biaxially oriented containers.

SUMMARY OF THE INVENTION

It is a primary object of the present invention to provide articles such as containers formed from highly crystalline olefin polymers which exhibit improved transparency and impact strength.

It is another object of the present invention to provide such articles formed by biaxial orientation blow molding.

It has been found that the foregoing objects may be attained by using in the formation of such articles, an olefin polymer having definite physical properties or by using a material in which a specially selected nucleating agent is added to said polymer.

DESCRIPTION OF THE PREFERRED EMBODIMENTS

According to the present invention, the two properties of transparency and impact strength are improved from the standpoint of the polymer material used. The first embodiment of the present invention relates to articles such as hollow containers obtained by using a statistical random copolymer of propylene and ethylene having a melt index of from 0.6 to 3.0 g/10 min. and an ethylene content of from 0.3 to 5.0% by weight, cooling and solidifying a tubular body formed by extrusion molding of said copolymer and then extending the body in biaxial directions at an orientation temperature below the melting point in such a manner so as to attain an extension magnification ratio of at least 1.5 in each of longitudinal and lateral directions. The second embodiment of the present invention is characterized in that a mixture of from 0.03 to 0.20 part by weight of aluminum p-tert-butyl benzoate or sodium p-tert-butyl benzoate and 100 parts by weight of the statistical random copolymer of the first embodiment is used as the raw material.

In the past, random type propylene-ethylene copolymers have been used generally for biaxially oriented films in order to increase heat-sealabiliy as well as tear strength, and for injection molded products or the like for the purpose of increasing impact strength. However, little or no improvement in transparency has been obtained in either case. Therefore, it is apparent that the improvements in transparency and impact strength, and especially the remarkable increase in transparency obtained according to the present invention, are new and unexpected. While some increase in one or both of said properties, when compared to other blow molded products, can be obtained when such propylene ethylene copolymers are subjected to conventional blow molding, the increases are not of any significant amount. Noticeable improvements in both properties can be achieved only when these copolymers are employed in the biaxial orientation blow molding of a tubular body formed by extrusion as set forth in the present invention.

The copolymer used according to the present invention is a statistical random copolymer of propeylene and ethylene having a melt index (MI) of from 0.6 to 3.0 g/10 min. and an ethylene content of from 0.3 to 5.0% by weight. If the MI value is lower than 0.6, transparency and also extrudability will be decreased. When the value exceeds 3.0, impact strength decreases and the consistency of dimensions obtained during extrusion of the tubular body is reduced so that irregularities in wall thickness tend to occur. When the ethylene content is less than 0.3%, no improvement in transparency or in impact strength will be apparent whereas when the ethylene content is above 5.0%, no further increase in transparency over that of 5.0% content can be seen and the obtained article is impracticable as a packaging container because of marked decreases in rigidity and buckling strength.

The statistical random propylene-ethylene copolymer of the present invention can be produced by any conventional production method such as, for example, a method in which a propylene-ethylene gas mixture containing the desired amount of ethylene is subjected to polymerization under definite conditions, a method in which the mixing ratio of both of the gases is varied either continuously or intermittently during the polymerization, or a method in which the reaction temperature of the reaction pressure is varied so as to control the conversion yield of ethylene. The control of MI can also be accomplished by conventional means such as by the use of chain transfering agents, control of reaction temperature, etc.

The molding procedure is also not restricted, so long as an extruded tubular body suitable for use with an orientation blow molding method can be obtained. As to the magnification ratio, an extension of at least 1.5 or more is necessary for each of the longitudinal (axial of the tube) and lateral (radial) directions. The magnification ratio of extension in the lateral direction is expressed by the ratio of the average outer diameter of the blown product to that of the tubular body before extension. This is because of the fact that little or no effect of orientation by extension will be observed at a magnification ratio of below 1.5, and improvements in transparency and impact strength will not be sufficient. The biaxial extension may be of a successive or simultaneous nature. Although the extruded tubular body may be cut into articles either before or after it is extended, it is desirable to quench the tubular body as soon as possible upon solidification by cooling directly after extrusion thereof. The reason for this is that to obtain substantial improvement of transparency of the final product, it is helpful to conduct the solidification while suppressing the growth of spherulites in the intermediate crosssectional layer of the tubular body wall as much as possible. For this purpose, many measures can be used such as, for example, the use of water circulating through a refrigerator for the cooling water, disposing an air passageway in the central portion of the annular extrusion die in order to jet air and moisture therein for cooling the product in the direction of extrusion, etc.

The aluminum p-tert-butyl benzoate or sodium p-tert-butyl benzoate used according to the present invention are known as socalled crystallization nucleating agents. However, it has been found that other known crystallization nucleating agents, such as sebacic acid, magnesium carbonate and anhydrous thioglycollic acid, etc., do not exhibit any substantial effect for attaining the objects of the presents invention. The admixing of the aluminum or sodium salt with the copolymer can be carried out either by a dry mixing procedure using apparatus such as a Henschell mixer, ribbon blender, etc., in a wet mixing procedure by admixing in the form of an aqueous slurry with subsequent drying, in a direct compounding procedure or in a master batch procedure. However, it is essential to disperse the salt into the resin mass so as to be substantially homogeneous.

In general, transparency of crystalline olefin polymer products depends primarily upon the physical smoothness of both surfaces, the degree of crystallization in the inner layer, the average crystal size and the homogeneity thereof.

Inspection by a polarizing microscope of the sections of cut pieces from each of two formed products, to one of which was added aluminum or sodium p-tert-butyl benzoate in accordance with the present invention and the other being produced without additive while maintaining the other conditions identical, revealed that the crystals in the central portion of the cut piece of the product without additive had grown substantially and the average crystal size, for example, reached to from about several tens to several hundreds of microns whereas the average crystal size of of the product with additive was barely about 10 $\mu$ or so and the crystal size distribution was homogeneous. Inspection of the outer surface of each of the products using a phase contrast microscope revealed that in the product without additive a portion of the coarse crystals extended to the surface region so as to decrease surface smoothness, whereas the product with additive was constituted from aggregates of very fine crystals and the outermost layer thereof had been solidified in a substantially amorphous state so that it exhibited an extremely smooth surface. Thus, since the physical smoothness of both the external and internal surfaces is improved and also since in the region of inner layer, the crystal aggregates are homogeneous and of small size and a homogeneous molecular orientation is imparted, an improvement in transparency and, thus, a formed product with especially high transparent visibility can be attained.

In order to further illustrate the present invention in detail, the following example is presented.

EXAMPLE

Using propylene-ethylene copolymers in which the ethylene content, nucleating agent and amount of additive were different, hollow containers were molded under the conditions described hereinafter and, with these containers, transparency (haze), impact strength (repeated drop test) and rigidity (Young's modulus) were determined. The results obtained were as shown in the following Tables 1 and 2.

Molding Conditions:

| | |
|---|---|
| Temperature of extrusion die | 210°C. |
| Temperature of resin during molding | 230°C. |
| Cooling water temperature before cut off of the tubular body | 15°C. |
| Cooling time before cut off | 3 min. |
| Dimensions of the tubular body before being cut off | |
| Outer diameter | 22 mm |
| Wall thickness | 6 mm |
| Length | 150 mm |
| Extension ratio | |
| Longitudinal magnification | ca 2.5 times |
| Lateral magnification | ca 2.0 times |
| Average wall thickness of container | 0.6 mm |
| Shape of container | cylindrical |
| Volume of container | 300 ml |
| Weight of container | 20 g |

METHOD OF ADDITION OF NUCLEATING AGENT

A master batch power of copolymer containing 1.0% by weight of nucleating agent was prepared in a Henschell mixer and this was pelletized using a 60 mm extruder at an extrusion temperature of 210°C. The desired amount of nucleating agent in each copolymer was adjusted by blending these pellets with pellets of copolymer containing no nucleating agent in appropriate amounts. In the starting copolymers, no additive except for the usual antioxidant was used other than the nucleating agent.

The transparency is comparable to containers made by blow molding from polyvinyl chloride and the impact strength can also compete with containers made of high density polyethylene by blow molding.

What is claimed is:

1. An article having improved transparency and impact strength which is obtained by cooling and solidifying an extruded tubular body of a highly crystalline olefin polymer and thereafter extending it biaxially at an orientation temperature below the melting point to attain an extension magnification ratio of at least 1.5 for each of longitudinal and lateral directions, wherein said polymer is a statistical random copolymer of prop- Table 1

Influence of MI and Ethylene Content

| MI [1] (g/10 min) | Ethylene [2] content (%) | Haze of the formed product (%) [3] | | | | Drop [4] strength (times) | Young's [5] modulus (Kg/cm²) |
|---|---|---|---|---|---|---|---|
| | | Total | External surface | Internal surface | Inner layer | | |
| 0.5 | — | 21.2 | 10.0 | 5.0 | 6.2 | >20 | 17,900 |
| 1.1 | — | 15.7 | 8.5 | 4.6 | 2.6 | 20 | 16,000 |
| 3.0 | — | 15.8 | 7.9 | 4.3 | 3.6 | 17 | — |
| 4.0 | — | 15.5 | 7.5 | 4.0 | 4.0 | 15 | — |
| 0.6 | 0.3 | 19.9 | 10.0 | 4.2 | 5.7 | >20 | — |
| 1.3 | 0.3 | 14.8 | 5.4 | 4.8 | 4.6 | >20 | 15,800 |
| 2.2 | 0.3 | 14.5 | 5.5 | 5.5 | 3.5 | >20 | 16,500 |
| 4.0 | 0.3 | 17.2 | 3.5 | 9.4 | 4.3 | >20 | — |
| 1.1 | 1.5 | 8.5 | 3.2 | 2.7 | 2.6 | >20 | 14,500 |
| 0.3 | 3.0 | 11.0 | 5.4 | 2.0 | 3.6 | >20 | — |
| 0.6 | 3.0 | 12.8 | 6.0 | 3.1 | 3.7 | >20 | — |
| 1.1 | 3.0 | 8.4 | 3.0 | 2.5 | 2.9 | >20 | 13,400 |
| 1.1 | 6.0 | 8.5 | 3.2 | 2.3 | 3.0 | >20 | 9,800 |

Notes on Table 1:
[1] According to ASTM-D-1238
[2] Calculated from infrared absorption spectrum.
[3] A hazeometer model TC-12 from Tokyo Denshoku was used; based on JIS-K-6714; a cut piece from the formed product was used as a sample; external surface haze is obtained by substracting the value of the inner layer haze from the value observed while coating liquid paraffin on the internal surface of the sample; internal surface haze represents a value observed while coating the external surface of the sample with liquid paraffin and substracting therefrom the inner layer haze value; inner layer haze represents a value observed while coating both surfaces of the sample with liquid paraffin; total haze is the sum of the above values.
[4] Expressed as the number of vertical drops from a height of 120 cm onto a concrete surface until rupture occurred, the container being filled with an aqueous solution of sodium chloride at −5°C. after being dipped in the same solution for 30 minutes.
[5] Obtained with an Instron universal tension tester according to ASTM-D-638; calculated from the stress-strain curve.

Table 2

Influence of Nucleating Agent

| MI (g/10 min.) | Ethylene content (%) | Nucleating agent | | Haze of the formed product (%) | | | | Drop strength (times) |
|---|---|---|---|---|---|---|---|---|
| | | Sort | Amount [6] | Total | External surface | Internal surface | Inner layer | |
| 1.1 | — | — | 0 | 15.7 | 8.5 | 4.6 | 2.6 | 20 |
| 1.1 | — | Sebacic acid | 10 | 17.4 | 6.5 | 4.0 | 6.9 | 20 |
| 1.1 | — | Al-B [7] | 1 | 15.5 | 7.0 | 5.3 | 3.2 | 20 |
| 1.1 | — | '' | 5 | 13.1 | 5.5 | 4.0 | 3.6 | 20 |
| 1.1 | — | '' | 10 | 11.2 | 4.0 | 3.8 | 3.4 | 20 |
| 1.1 | — | '' | 20 | 11.2 | 4.2 | 3.0 | 4.0 | — |
| 1.1 | — | '' | 30 | 11.8 | 4.3 | 3.5 | 4.0 | — |
| 1.1 | — | Na-B [8] | 10 | 13.0 | 4.8 | 4.0 | 4.2 | 20 |
| 1.1 | 3 | — | 0 | 8.4 | 3.0 | 2.5 | 2.9 | >20 |
| 1.1 | 3 | Al-B | 1 | 8.2 | 2.5 | 2.7 | 3.0 | >20 |
| 1.1 | 3 | '' | 5 | 7.4 | 3.0 | 1.5 | 2.9 | >20 |
| 1.1 | 3 | '' | 10 | 5.9 | 0.9 | 2.0 | 3.0 | >20 |
| 1.1 | 3 | '' | 20 | 7.0 | 1.8 | 2.0 | 3.2 | — |
| 1.1 | 3 | '' | 30 | 6.8 | 1.3 | 2.2 | 3.3 | — |
| 1.1 | 3 | Sebacic acid | 10 | 10.7 | 3.4 | 3.6 | 3.7 | >20 |
| 1.1 | 3 | GM [9] | 10 | 9.4 | 3.1 | 3.0 | 3.3 | >20 |

Notes on Table 2:
[6] Parts by weight of nucleating agent per 10,000 parts of copolymer.
[7] Abbreviation of aluminum p-tert-butyl benzoate.
[8] Abbreviation of sodium p-tert-butyl benzoate.
[9] Abbreviation of

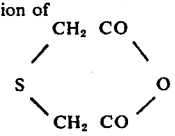

As is clear from Tables 1 and 2, containers formed in accordance with the present invention are remarkably excellent in transparency and impact strength and the decrease in rigidity is only slight as compared to the contrast containers.

ylene with ethylene having a melt index of 0.6 – 3.0 g/10 min. and an ethylene content of from 0.3% to 5.0% by weight and contains a crystalline nucleating agent selected from the group consisting of aluminum p-tert-butyl benzoate and sodium p-tert-butyl benzoate in an amount of from 0.03 to 0.20 part by weight per 100 parts by weight of said statistical random copolymer.

2. The article according to claim 1 wherein said article is a container.

3. The article according to claim 1 wherein said statistical random copolymer has an ethylene content of from 1.5% to 5.0% by weight.

* * * * *